(12) United States Patent
Bhuvad et al.

(10) Patent No.: US 10,825,307 B1
(45) Date of Patent: Nov. 3, 2020

(54) TRANSACTION PLAN MANAGEMENT (71) Applicant: International Business Machines Corporation, Armonk, NY (US)

(72) Inventors: Mandar Dattatraya Bhuvad, Pune (IN); Nitesh Jankilal Shreemali, Pune (IN); Sreenath Raghunath, Pune (IN); Manish Madhukarrao Tumbde, Pune (IN); Girish Padmanabhan, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/450,258

(22) Filed: Jun. 24, 2019

(51) Int. Cl.
*G07F 19/00* (2006.01)
*G06Q 40/00* (2012.01)
(Continued)

(52) U.S. Cl.
CPC ............ *G07F 19/206* (2013.01); *G06Q 10/02* (2013.01); *G06Q 20/1085* (2013.01); *G06Q 20/3221* (2013.01); *G06Q 40/02* (2013.01)

(58) Field of Classification Search
CPC ...... G07F 19/20; G07F 19/202; G07F 19/203; G07F 19/206; G06Q 20/108; G06Q 20/1085; G06Q 20/322; G06Q 20/3223
See application file for complete search history.

(56) References Cited

U.S. PATENT DOCUMENTS

| | | | |
|---|---|---|---|
| 5,389,773 A | 2/1995 | Coutts | |
| 6,519,576 B1 * | 2/2003 | Freeman | G06Q 30/02 706/21 |

(Continued)

FOREIGN PATENT DOCUMENTS

| | | |
|---|---|---|
| CN | 106022914 A | 10/2016 |
| CN | 105205945 B | 10/2018 |

(Continued)

OTHER PUBLICATIONS

"Number of debit card transactions in India from Aug. 2016 to Aug. 2018, by transaction location (in millions)", ATM vs POS: Debit card transactions in India 2018 | Statistic, © Statista 2019, 3 pages, <https://www.statista.com/statistics/631451/debit-card-transactions-in-india-by-location/>.

(Continued)

*Primary Examiner* — Thien M Le
*Assistant Examiner* — April A Taylor
(74) *Attorney, Agent, or Firm* — Daniel R. Simek (57) ABSTRACT

Aspects of the present invention disclose a method for determining and providing notifications regarding ATMs that can fulfill a transaction plan of a user. The method includes one or more processors determining a transaction plan for a user, the transaction plan including a schedule of future transactions of the user based on historical user data and user-provided information, wherein the determined transaction plan includes a forecast future withdrawal amount and corresponding time. The method further includes one or more processors identifying an automated teller machine (ATM) preferred by the user. The method further includes one or more processors determining whether the ATM preferred by the user can fulfill the determined transaction plan. In response to determining that the ATM preferred by the user cannot fulfill the determined transaction plan, the method further includes determining one or more alternate ATMs that can fulfill the determined transaction plan.

18 Claims, 4 Drawing Sheets

(51) Int. Cl.
*G06Q 20/32* (2012.01)
*G06Q 20/10* (2012.01)
*G06Q 10/02* (2012.01)
*G06Q 40/02* (2012.01)

(56) References Cited

U.S. PATENT DOCUMENTS

| | | | |
|---|---|---|---|
| 8,490,869 B2* | 7/2013 | Brown | G06Q 20/10 |
| | | | 235/380 |
| 9,378,510 B2 | 6/2016 | Gupta | |
| 9,691,059 B1* | 6/2017 | Courtright | G07F 7/0846 |
| 9,773,246 B2* | 9/2017 | Faith | G06Q 10/06375 |
| 10,453,041 B1* | 10/2019 | Walker | G07F 19/203 |
| 10,515,348 B2* | 12/2019 | Phillips | G07F 19/211 |
| 2012/0143756 A1 | 6/2012 | Rielly | |
| 2016/0012505 A1 | 1/2016 | Hanson | |
| 2016/0019537 A1* | 1/2016 | Raja | G06Q 20/385 |
| | | | 705/43 |
| 2016/0019640 A1* | 1/2016 | Barnett | G06Q 20/3224 |
| | | | 705/35 |
| 2018/0204424 A1 | 7/2018 | Licht | |
| 2018/0341934 A1* | 11/2018 | Rodrigues | G07F 19/209 |
| 2019/0108731 A1* | 4/2019 | Hazard | G07F 19/206 |

FOREIGN PATENT DOCUMENTS

| | | |
|---|---|---|
| CN | 108961604 A | 12/2018 |
| EP | 645744 A2 | 3/1995 |
| JP | 2014174802 A | 9/2014 |

OTHER PUBLICATIONS

Delisa Coleman, Lauren, "CES 2019: Why IBM CEO Ginni Rometty's Opening Address Delivers", Jan. 9, 2019, 5 pages, <https://www.forbes.com/sites/laurencoleman/2019/01/09/ces-2019-why-ibm-ceo-ginni-rommetys-opening-address-delivers/#747c3420d543>.

* cited by examiner

TRANSACTION PLAN MANAGEMENT

BACKGROUND OF THE INVENTION

The present invention relates generally to the field of data analytics, and more particularly to managing a transaction plan for a user.

An automated teller machine (ATM) is an electronic telecommunications device that enables customers of financial institutions to perform financial transactions, such as cash withdrawals, deposits, transfer funds, or obtaining account information, without the need for direct interaction with bank staff. ATMs are known by a variety of names, including automatic teller machine (ATM) (e.g., in the United States), often redundantly ATM machine, automated banking machine (ABM) (e.g., in Canada), cash point, cash machine, minibank, etc.

Using an ATM, customers can access their bank deposit or credit accounts in order to make a variety of financial transactions most notable cash withdrawals but also check balances, or credit mobile phones. ATMs can be used to withdraw cash in a foreign country. Customers are typically identified by inserting a plastic ATM card (or some other acceptable payment card) into the ATM, with authentication being by the customer entering a personal identification number (PIN), which must match the PIN stored in the chip on the card (if the card is so equipped), or in the issuing financial institution's database. Customers can also interface with an ATM (or a network of a corresponding instruction) via an application, such as an app installed on a smartphone.

SUMMARY

Aspects of the present invention disclose a method, computer program product, and system for determining and providing notifications regarding ATMs that can fulfill a transaction plan of a user. The method includes one or more processors determining a transaction plan for a user, the transaction plan including a schedule of future transactions of the user based on historical user data and user-provided information, wherein the determined transaction plan includes a forecast future withdrawal amount and corresponding time. The method further includes one or more processors identifying an automated teller machine (ATM) preferred by the user. The method further includes one or more processors determining whether the ATM preferred by the user can fulfill the determined transaction plan. In response to determining that the ATM preferred by the user cannot fulfill the determined transaction plan, the method further includes determining one or more alternate ATMs that can fulfill the determined transaction plan.

In another embodiment, the method further includes one or more processors determining whether the user has deviated from the determined transaction plan based on completed transactions of the user.

DETAILED DESCRIPTION

Embodiments of the present invention allow for gathering and utilizing historical user data and data associated with automated teller machines (ATMs) to determine a transaction plan for a user. The transaction plan includes a schedule of future transactions of the user (i.e., spending and withdrawing money) based on historical data and user-provided information. Embodiments of the present invention can identify a user-preferred ATM (e.g., based on historical usage) and determine whether the identified ATM can satisfy the determined transaction plan for the user. In response to determining that the user-preferred ATM cannot satisfy the determined transaction plan for the user, additional embodiments of the present invention can identify and recommend a suitable substitute ATM to the user.

Further, embodiments of the present invention can leverage a plurality of additional factors in the determination of whether an ATM can satisfy a transaction plan (e.g., a travel route of a user, indication of urgency, resource supplies of ATMs, etc.). In another embodiment, a deviation in the transaction plan for the user is identified. Accordingly, embodiments of the present invention can determine whether the identified user-preferred ATM can satisfy the identified deviation in the transaction plan for the user. In response to determining that the user-preferred ATM cannot satisfy the identified deviation in the transaction plan for the user, embodiments of the present invention can identify and recommend a suitable substitute ATM to the user.

Some embodiments of the present invention provide improvements by providing ATM recommendations to user based on resource supply (e.g., money, paper, etc.) and predictive analytics. Embodiments of the present invention can operate to distribute the resource utilization across ATMs based on real-time analysis of demand, which reduces downtime of a distributed ATM network and also significant increases availability and efficiency.

Implementation of embodiments of the invention may take a variety of forms, and exemplary implementation details are discussed subsequently with reference to the Figures.

Figure 1:
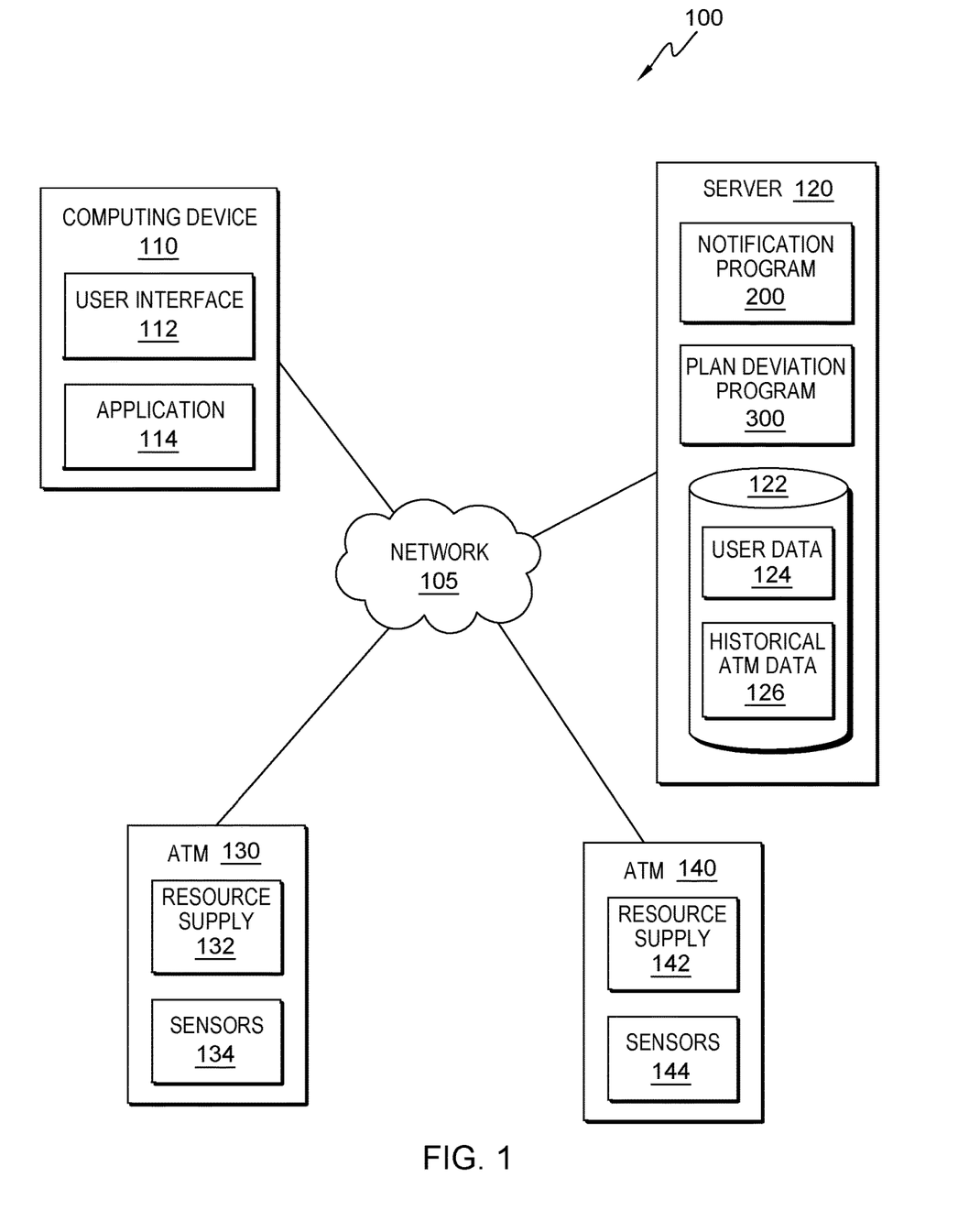
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes computing device 110, server 120, ATM 130, and ATM 140, all interconnected over network 105. In an example embodiment, an individual associated with and/or utilizing computing device 110 utilizes one or more of ATM 130 and ATM 140. In this example embodiment, server 130 can provide a recommendation to utilize ATM 130 or ATM 140 to computing device 110, in accordance with various embodiments of the present invention.

Network 105 can be, for example, a local area network (LAN), a telecommunications network, a wide area network (WAN), such as the Internet, or any combination of the three, and include wired, wireless, or fiber optic connections. In general, network 105 can be any combination of connections and protocols that will support communications between computing device 110, server 120, ATM 130, and ATM 140, in accordance with embodiments of the present invention. In various embodiments, network 105 facilitates communication among a plurality of networked ATMs (e.g., ATM 130 and ATM 140), corresponding users (e.g., an individual utilizing computing device 110), and corresponding management services (e.g., server 120).

In various embodiments of the present invention, computing device 110 may be a workstation, personal computer, personal digital assistant, mobile phone, or any other device capable of executing computer readable program instructions, in accordance with embodiments of the present invention. In general, computing device 110 is representative of any electronic device or combination of electronic devices capable of executing computer readable program instructions. Computing device 110 may include components as depicted and described in further detail with respect to FIG. 4, in accordance with embodiments of the present invention. In an example embodiment, computing device 110 is a smart device, such as a smartphone, a smart watch, etc.

Computing device 110 includes user interface 112 and application 114. User interface 112 is a program that provides an interface between a user of computing device 110 and a plurality of applications that reside on the computing device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API).

Application 114 can be representative of one or more applications (e.g., an application suite) that operate on computing device 110. In an example embodiment, application 114 is a client-side application of an enterprise associated with server 120, ATM 130, and ATM 140. In another example embodiment, application 114 is a web browser that an individual utilizing computing device 110 utilizes (e.g., via user interface 112) to access information over network 105, such as services associated with ATM 130 and ATM 140 or provided by an enterprise associated with server 120. In other aspects of the present invention, application 114 can be representative of applications that provide additional functionality (e.g., camera, messaging, etc.), in accordance with various aspects of the present invention.

In example embodiments, server 120 can be a desktop computer, a computer server, or any other computer systems, known in the art. In certain embodiments, server 120 represents computer systems utilizing clustered computers and components (e.g., database server computers, application server computers, etc.) that act as a single pool of seamless resources when accessed by elements of data processing environment 100 (e.g., computing device 110, ATM 130, and ATM 140). In general, server 120 is representative of any electronic device or combination of electronic devices capable of executing computer readable program instructions. Server 120 may include components as depicted and described in further detail with respect to FIG. 4, in accordance with embodiments of the present invention.

Server 120 includes notification program 200, plan deviation program 300, and storage device 122, which includes user data 124 and historical ATM data 126. In one embodiment, server 120 is associated with a particular enterprise (e.g., a business or financial institution) that manages a network of ATMs, including ATM 130 and ATM 140. In one embodiment, notification program 200 can determine and provide notifications regarding ATMs that can fulfill a transaction plan of a user, in accordance with embodiments of the present invention. In additional embodiments, in response to determining that a user-preferred ATM cannot fulfill the transaction plan corresponding to the user, notification program 200 can determine and provide recommendations of alternate ATMs that can fulfill the transaction plan.

In another embodiment, plan deviation program 300 detects a deviation from the transaction plan corresponding to a user, and accordingly can determine and provide notifications regarding ATMs that can fulfill the transaction plan, including the deviation, for the user, in accordance with embodiments of the present invention. In additional embodiments, in response to determining that a user-preferred ATM cannot fulfill the deviation in the transaction plan corresponding to the user, plan deviation program 300 can determine and provide recommendations of alternate ATMs that can fulfill the transaction plan.

Storage device 122 can be implemented with any type of storage device, for example, persistent storage 405, which is capable of storing data that may be accessed and utilized by server 120, computing device 110, ATM 130, and ATM 140, such as a database server, a hard disk drive, or a flash memory. In other embodiments, storage device 122 can represent multiple storage devices and collections of data within server 120. In various embodiments, storage device 122 includes information that notification program 200 and plan deviation program 300 access and utilize, in accordance with embodiments of the present invention. Storage device 122 includes user data 124 and historical ATM data 126.

In example embodiments, user data 124 includes information associated with registered users of an enterprise that manages ATM 130 and ATM 140 (e.g., a financial institution), in accordance with embodiments of the present invention. For example, an individual utilizing computing device 110 completes a registration process, provides information, and authorizes the collection and analysis (i.e., opts-in) of data associated with the individual, by server 130 (e.g., via notification program 200 and plan deviation program 300). In this example, the individual can authorize server 120 to utilize a camera of an ATM to identify the individual and also authorize server 120 to monitor transaction information of the individual to determine a transaction plan. In other examples, the individual can provide authorization of a subset of categories of data collection (i.e., opt-in out of certain categories of data collection).

In one embodiment, user data 124 includes user profile information for respective users, such as user identification information. For example, user data 124 includes an image, or other user-provided biometric information, that server 130 can utilize to identify a user (e.g., in reference to real-time camera information from an ATM, such as from sensors 134 and sensors 144, for facial recognition). In another embodiment, user data 124 includes information associated with how respective users utilize ATMs. For example, user data 124 includes a favorite and/or normal withdrawal amount and a withdrawal pattern associated with the individual utilizing computing device 110.

In a further embodiment, user data 124 includes a transaction plan, and corresponding information, for a user, such as an individual utilizing computing device 110. The transaction plan includes a schedule of future transactions of the user (i.e., spending and withdrawing money) based on historical data and user-provided information. In other embodiments, user data 124 includes additional information associated with use of an ATM, such as user card health information, user-provided calendar information, user access profile information (e.g., ATM accessibility requirements). User data 124 can also include user preference information, such as a user-preferred ATM (e.g., ATM 130), user notification preferences, user-provided scheduling information, etc.

In various embodiments, historical ATM data 126 includes historical usage information for specific ATMs managed by server 120 (e.g., ATM 130 and ATM 140), in accordance with embodiments of the present invention. For example, historical ATM data 126 includes respective historical transaction information for a specific ATM, such as ATM 130. In additional embodiments, historical ATM data 126 includes information that notification program 200 and plan deviation program 300 can access and utilize, in accordance with embodiments of the present invention. For example, notification program 200 can access historical ATM data 126 to determine whether ATM 130 can satisfy a transaction plan associated with an individual utilizing computing device 110. In another example, notification program 200 can access historical ATM data 126 to determine whether an alternate ATM (e.g., ATM 140) can satisfy a transaction plan associated with an individual utilizing computing device 110.

ATM 130 and ATM 140 are representative of automated teller machines that are associated with an enterprise associated with server 120, in accordance with embodiments of the present invention. In an example embodiment, an individual utilizing computing device 110 is registered to utilize ATM 130 and ATM 140 (e.g., is a member of a corresponding financial institution). In various embodiments, ATM 130 and ATM 140 are part of a network of ATMs (e.g., a plurality of ATMs associated with a particular financial institution), which are manages by server 120, in accordance with various embodiments of the present invention. ATM 130 and ATM 140 include respective instances of resources supplies (i.e., resource supply 132 and resource supply 142) and sensors (i.e., sensors 134 and sensors 144).

In one embodiment, resource supply 132 and resource supply 142 include information indicating an amount of resources that a respective instance of ATM 130 and ATM 140 contain. In an example scenario, the resources include a supply of cash contained within an ATM, which is updated in response to each transaction at an ATM. In another scenario, the resources can also include an amount of receipt paper, or other quantifiable resource, contained within an ATM.

In example embodiments, sensors 134 and sensors 144 includes cameras and other sensors (e.g., microphone, etc.), associated with a respective instance of ATM 130 and ATM 140, that server 130 can access and utilize in accordance with various embodiments of the present invention. Embodiments of the present invention utilize sensors 134 and sensors 144 to gather user-authorized information for users of ATM 130 and ATM 140. For example, server 120 can utilize a camera, of sensors 134, to perform facial recognition on an individual utilizing computing device 110 to identify the individual while in line at ATM 130, when the individual has authorized facial recognition identification (e.g., in user data 124). In another embodiment, server 120 can access a camera, of sensors 134, at ATM 130 to identify a length of a queue at ATM 130.

In an additional embodiment, sensors 134 and sensors 144 can monitor respective instances of resource supply 132 and resource supply 142 and convey corresponding data to server 120. In a further example, server 120 can utilize sensors of an ATM to identify a user that is in proximity to an ATM to predict whether the user is a potential customer for the ATM. In another embodiment, sensors 134 ad sensors 144 can includes sensors that monitor a heath of a card provided by a user, to determine whether a failed transaction is the result of a damaged card. In this embodiment, server 120 can provide a notification to the user corresponding to the damaged card.

Figure 2:
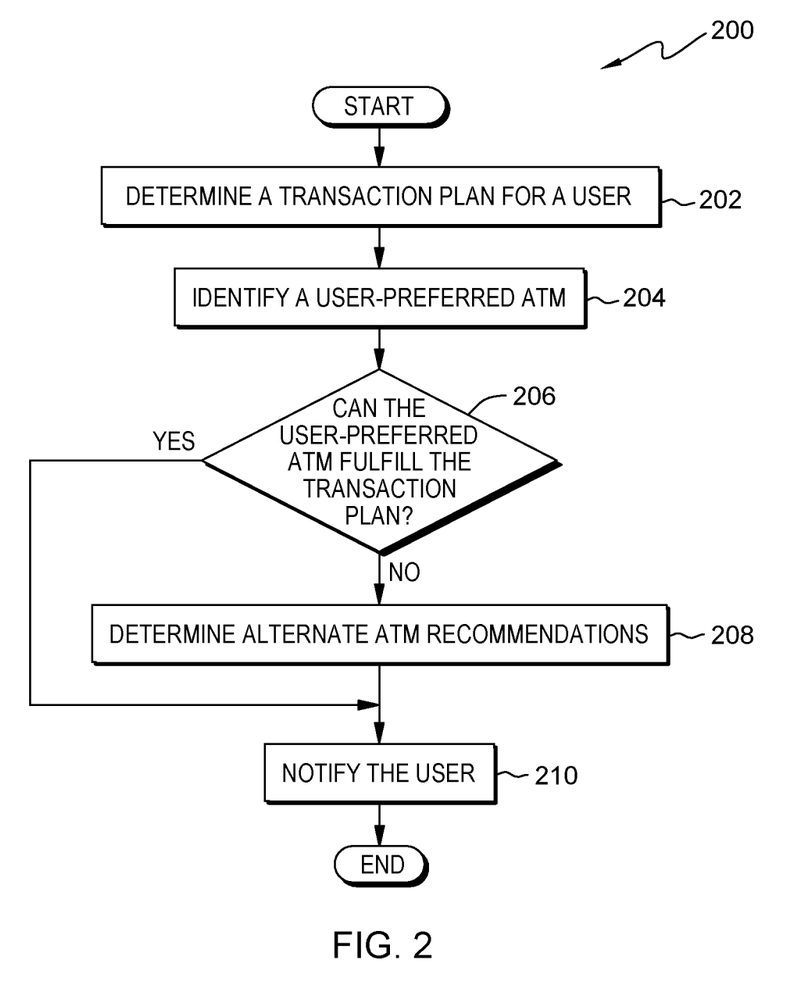
FIG. 2 is a flowchart depicting operational steps of a program for determining and providing notifications regarding ATMs that can fulfill a transaction plan of a user, in accordance with an embodiment of the present invention.

FIG. 2 is a flowchart depicting operational steps of notification program 200, a program for determining and providing notifications regarding ATMs that can fulfill a transaction plan of a user, in accordance with embodiments of the present invention. In one embodiment, notification program 200 initiates periodically to determine, or update, a transaction plan for a user. In another embodiment, notification program 200 initiates in response to a user request (e.g., via user input into user interface 112 of computing device 110). In an additional embodiment, notification program 200 can operate as a background process that analyzes (user authorized) collected data associated with a user.

In step 202, notification program 200 determines a transaction plan for a user. The transaction plan includes a schedule of future transactions of the user (i.e., spending and withdrawing money) based on historical data and user-provided information. In one embodiment, notification program 200 generated a new transaction plan for a user. In another embodiment, notification program 200 identifies an existing transaction plan associated with a user (e.g., in user data 124), which notification program 200 can utilize or update with new information associated with the user. In an example embodiment, the transaction plan corresponds to a specified time frame (e.g., a transaction plan for the coming week, the next three days, today, etc.), which notification program 200 can determine based on historical transaction and ATM usage information associated with the user (from user data 124).

In various embodiments, notification program 200 analyzes historical transaction information, from user data 124, associated with a user to determine the transaction plan for the user. Notification program 200 can also utilize user-provided information (e.g., real-time information) to determine the transaction plan for the user. For example, an individual utilizing computing device 110 provides input that forecasts upcoming transactions and/or ATM activity that notification program 200 determines is relevant to the transaction plan.

In an example scenario, notification program 200 access user data 124 associated with an individual utilizing computing device 110 (i.e., historical data) and identifies input into computing device 110 indicating future transactions of the individual (i.e., real-time data). In this scenario, notification program 200 determines a transaction plan for the individual utilizing computing device 110 based on the historical information and the real-time information. For example, notification program 200 determines that the individual currently has $500 and, based on the historical data and real-time data, the individual is projected to spend $400 over the next three days. Notification program 200 can then determine (also based on the historical data and real-time data) that the individual is projected to utilize an ATM in four days and is forecast to withdraw $600 (e.g., user favorite amount, user-indicated amount, etc.).

In an alternate scenario, an individual utilizing computing device 110 indicates that the individual will withdraw $500 from an ATM tomorrow. In this scenario, notification program 200 determines the transaction plan to be that the user will withdraw $500 tomorrow.

In step 204, notification program 200 identifies a user-preferred ATM. In various embodiments, notification program 200 determines the user-preferred ATM based on user data 124, an optionally an indication in historical ATM data 126. In one embodiment, notification program 200 identifies the user-preferred ATM utilizing an indication in a corresponding instance of user data 124. In another embodiments, notification program 200 determines that the most frequently used ATM (based on information in in user data 124) is the user-preferred ATM. In additional embodiments, notification program 200 can leverage additional criteria to determine the user-preferred ATM, such as user provided calendar information, travel route information, user selection, etc. In an example scenario, notification program 200 determines that ATM 130 is the user-preferred ATM of the individual utilizing computing device 110, based on the corresponding instance of user data 124.

In decision step 206, notification program 200 determines whether the user-preferred ATM can fulfill the transaction plan. In one embodiment, notification program 200 determines whether the resource supply of the user-preferred ATM (e.g., resource supply 132 of ATM 130) can fulfill the transaction plan (determined in step 202). Notification program 200 can also leverage an instance of historical ATM data 126 that corresponds to the user-preferred ATM to determine whether the user-preferred ATM can fulfill the transaction plan. In an additional embodiment, notification program 200 identifies a forecast withdrawal amount and date from the determined transaction plan (from step 202) and predicts whether the user-preferred ATM can fulfill the forecast transaction on the date (e.g., based on the resource supply and historical ATM data 126).

In an example, notification program 200 determines that the transaction plan indicated a forecast $300 cash withdrawal for today. In this example, notification program 200 determined the user-preferred ATM to be ATM 130 (in step 204). Accordingly, notification program 200 determines whether ATM 130 can fulfill the forecast transaction at a predicted time of day, based on resource supply 132 and historical ATM data 126. In another example, notification program 200 can determine whether the user-preferred ATM is out of service. If an ATM is out of service or forecast to be out of service at a predicted withdrawal time, then notification program 200 determines that the ATM cannot fulfil the transaction plan.

In another embodiment, notification program 200 can wait at decision step for more information, or until a defined time prior to a predicted ATM withdrawal of a transaction plan (e.g., one day, 2 hours, etc.), before determining whether the user-preferred ATM can fulfill the transaction plan. In another aspect of the present invention, notification program 200 can aggregate transaction plans and ATM requests from a plurality of users (in user data 124) to determine whether the user-preferred ATM will be able to fulfill a forecast transaction at a future time. For example, notification program 200 can determine that a high number of users are associated with transaction plans that forecast withdrawing money from ATM 130 during a specific time frame on a specific day.

In step 208, notification program 200 determines alternate ATM recommendations. More specifically, in response to determining that the user-preferred ATM cannot fulfill the transaction plan (decision step 206, NO branch), notification program 200 determines alternate ATM recommendations (step 208). In one embodiment, in response to determining that the user-preferred ATM cannot fulfill the transaction plan (decision step 206, NO branch), notification program 200 analyzes entries in historical ATM data 126 and resource supplies (e.g., resource supply 142) of a plurality of ATMs accessible over network 105. Notification program 200 can then determine one or more recommended alternate ATMs that can fulfill the transaction plan (e.g., ATM 140 and other accessible ATMs (not shown)).

For example, notification program 200 determines (in decision step 206) that ATM 130 cannot fulfill the determined transaction plan for the user (from step 202). In this example, notification program 200 determines an alternate ATM recommendation of ATM 140, based on resource supply 142 and historical ATM data 126.

Notification program 200 can also utilize additional factors in the determination of alternate ATMs (e.g., utilizing information in user data 124, etc.). In one scenario, notification program 200 can utilize a location of a user (e.g., computing device 110) and/or user-provided travel path information to identify candidate alternate ATMs and then determine alternate ATM recommendations. In this scenario, notification program 200 identifies ATMs that are near the route that the user travels on when commuting to work (e.g., or other user-provided navigation information or authorized navigation history in user data 124). Navigation program 200 can then, from the identified ATMs near the route, determine one or more recommended alternate ATMs, taking into account the respective ATM resource supplies and information from historical ATM data 126.

In another scenario, notification program 200 identifies a plurality of candidate alternate ATMs (e.g., based on real-time user data, user data 124, etc.) and forecasts the resource supply for the candidate ATMs at a predicted withdrawal time from the transaction plan. For example, notification program 200 analyzes resource supply 142 of ATM 140 and corresponding information in historical ATM data 126 (e.g., historical resource usage) to forecast the contents of resource supply 142 at an estimated cash withdrawal time from the determined transaction plan (of step 202). In this example, if notification program 200 determines that the forecast contents of resource supply 142 at the estimated cash withdrawal time will fulfil the transaction plan, then notification program 200 includes ATM 140 as an alternate ATM recommendation.

In additional scenarios, notification program 200 can utilize user calendar information (e.g., provided by the user and stored in user data 124) as parameters in determining alternate ATM recommendations. Further, notification program 200 can also utilize the calendar information to recommend alternate withdrawal times to the user (e.g., to accompany the alternate ATM recommendations, or for the user to wait to withdraw), which can augment the transaction plan. Accordingly, notification program 200 can recommend alternate ATMs based on a time and distance in relation to existing user scheduled commitments and/or appointments (e.g., upcoming travel, indicated urgency, etc.). In another embodiment, notification program 200 utilizes user-provided accessibility requirements (from user data 124) in determining candidate alternate ATMs, such as ramp accessibility, visual assistance, etc.

In a further embodiment, notification program 200 can identify and utilize additional charges associated with ATM usage in the determination of alternate ATM recommendations. For example, notification program 200 can determine additional charges (e.g., ATM fees, etc.) associated with usage of a particular ATM by a particular user (e.g., additional changes may apply when a user utilizes an ATM associated with a bank that the user is does not have an account with, etc.). In this example, notification program 200 utilizes the additional charges as a factor in determining the alternate ATM recommendations.

In step 210, notification program 200 notifies the user. In one embodiment, in response to determining that the user-preferred ATM can fulfill the transaction plan (decision step 206, YES branch), notification program 200 notifies the user that the user-preferred ATM can fulfill the transaction plan (step 210). Optionally, in response to determining that the user-preferred ATM can fulfill the transaction plan (decision step 206, YES branch), notification program 200 can terminate without sending notification to the user. In another embodiment, subsequent to determining alternate ATM recommendations (in step 208), notification program 200 send the user a notification that indicates that the user-preferred ATM cannot fulfill the transaction plan and includes the determines alternate ATM recommendations (from step 208). In various embodiments, notification program 200 identifies user preferences for notifications (e.g., in user data 124) and tailors the notification accordingly.

In example embodiments, notification program 200 notifies an individual utilizing computing device 110 by communicating the notification to application 114. Accordingly, notification program 200 can send the user a notification that includes one of more of: an indication of a recommended alternate ATM (e.g., ATM 140), information to accompany the recommendation (e.g., reasoning behind the recommendation to utilize the alternate ATM, highlighting an increase in time or distance relative to the user-preferred ATM, etc.), a plurality of recommended alternate ATMs that the user can select from, a recommendation to wait until a specified time to make a withdrawal from the user-preferred ATM or an alternate ATM, a recommendation to visit an ATM because the user is travelling on a route that is not near an active ATM, information indicating a health status associated with a ATM access card of the user, and other information that can be specified by user preferences (e.g., in sure data 124).

In various embodiments, an individual utilizing computing device 110 can interact with the notification (e.g., via user interface 112 and application 114) to select a recommendation of an ATM, which notification program 200 can utilize to update the transaction plan. In additional embodiments, the individual utilizing computing device 110 has the option to accept or reject the recommendation in the notification, after which notification program 200 can terminate or re-initiate. In an alternate embodiment, subsequent to providing the notification, or receiving a user selection of a recommendation, notification program 200 can re-initiate after a defined period of time (i.e., periodically).

Figure 3:
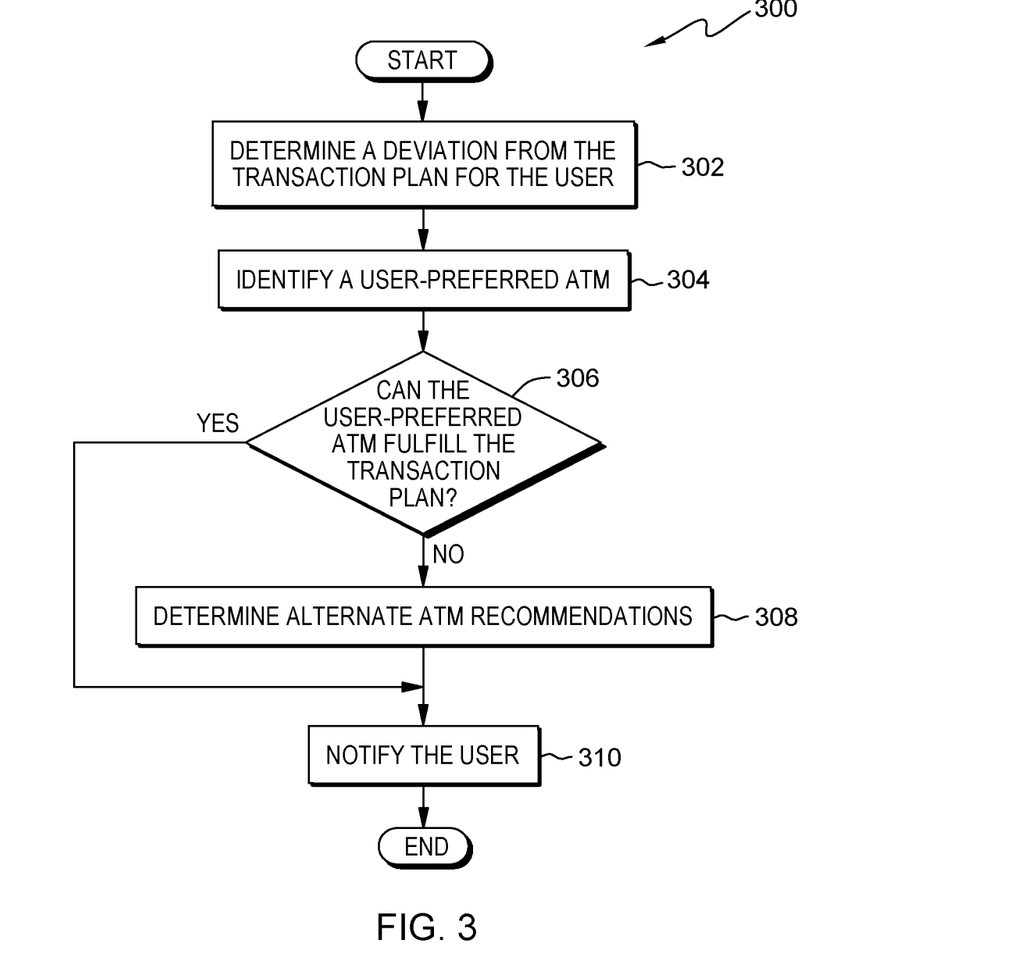
FIG. 3 is a flowchart depicting operational steps of a program for determining and providing notifications regarding ATMs that can fulfill a deviation to a transaction plan of a user, in accordance with embodiments of the present invention.

FIG. 3 is a flowchart depicting operational steps of plan deviation program 300, a program for determining and providing notifications regarding ATMs that can fulfill a deviation to a transaction plan of a user, in accordance with embodiments of the present invention. In one embodiment, plan deviation program 300 initiates periodically to detect whether a user has deviated from a corresponding transaction plan. In another embodiment, plan deviation program 300 initiates in response to receiving new or updated information relevant to a transaction plan associated with a user. In an additional embodiment, plan deviation program 300 initiates in response to receiving an indication of a deviation from a transaction plan (e.g., via user input into computing device 110).

In step 302, plan deviation program 300 determines a deviation from the transaction plan for the user. In one embodiment, plan deviation program 300 analyzes completed transactions of the user (e.g., amount of transactions, dollar amount, pattern, etc.) to determine whether the user has deviated from the determined transaction plan (determined in step 202 of notification program 200 and/or stored associated with the user in user data 124). In one scenario, plan deviation program 300 can utilize a defined threshold (e.g., defined amount of money, defined number of transaction, etc.) in relation to the transaction plan to determine whether current user activity is a deviation from the transaction plan. In an alternate scenario, plan deviation program 300 receives an indication from a user that the user is deviating (or had deviated) from the transaction plan. In another alternate scenario, plan deviation program 300 receives an indication that a resource supply of an ATM has deviated from a forecast amount, which can impact the transaction plan (e.g., an ATM activity deviation).

In an example embodiment, for the initial (e.g., baseline) transaction plan, an individual currently has $500 and, based on the historical data and real-time data, the individual is projected to spend $400 over the next three days. The transaction plan indicates that the individual is projected to utilize an ATM in four days and is forecast to withdraw $600 (e.g., user favorite amount, user-indicated amount, etc.). In this example, plan deviation program 300 receives or identifies new information, which includes transactions in the amount of $450 over the first two days of the transaction plan. Accordingly, plan deviation program 300 determines (e.g., based on a transaction monetary amount threshold) that the individual has deviated from the initial transaction plan. Plan deviation program 300 can then determine a deviated transaction plan for the individual, which projects that the individual will utilize an ATM to withdraw $600 the next day (i.e., on day prior to the projection of the initial transaction plan). In alternate example embodiments, plan deviation program 300 can identify that an individual has completes less transactions than included in an initial transaction plan. Accordingly, plan deviation program 300 can determine a deviated transaction plan that projects an ATM withdrawal at a later time than in the initial transaction plan.

In various embodiments of the present invention, subsequent to determining a deviation from the transaction plan for the user (step 302), plan deviation program 300 can proceed with similar processes as steps 204-210 of notification program 200. Accordingly, embodiments of the present invention provide plan deviation program 300 to include the operational capabilities of notification program, previously discussed in further detail with regard to FIG. 2.

In step 304, plan deviation program 300 identifies a user-preferred ATM. In various embodiments, plan deviation program 300 determines the user-preferred ATM based on user data 124, an optionally an indication in historical ATM data 126. In one embodiment, plan deviation program 300 identifies the user-preferred ATM utilizing an indication in a corresponding instance of user data 124. In another embodiments, plan deviation program 300 determines that the most frequently used ATM (based on information in in user data 124) is the user-preferred ATM. In additional embodiments, plan deviation program 300 can leverage additional criteria to determine the user-preferred ATM, such as user provided calendar information, travel route information, user selection, etc. In an example scenario, plan deviation program 300 determines that ATM 130 is the user-preferred ATM of the individual utilizing computing device 110, based on the corresponding instance of user data 124.

In decision step 306, plan deviation program 300 determines whether the user-preferred ATM can fulfill the transaction plan. In one embodiment, plan deviation program 300 determines whether the resource supply of the user-preferred ATM (e.g., resource supply 132 of ATM 130) can fulfill the deviated transaction plan (determined in step 302). Plan deviation program 300 can also leverage an instance of historical ATM data 126 that corresponds to the user-preferred ATM to determine whether the user-preferred ATM can fulfill the transaction plan. In an additional embodiment, plan deviation program 300 identifies an updated forecast withdrawal amount and date from the deviated transaction plan (from step 302) and predicts whether the user-preferred ATM can fulfill the forecast transaction on the date (e.g., based on the resource supply and historical ATM data 126).

In step 308, plan deviation program 300 determines alternate ATM recommendations. More specifically, in response to determining that the user-preferred ATM cannot fulfill the transaction plan (decision step 306, NO branch), plan deviation program 300 determines alternate ATM recommendations (step 308). In one embodiment, in response to determining that the user-preferred ATM cannot fulfill the deviated transaction plan (decision step 206, NO branch), plan deviation program 300 analyzes entries in historical ATM data 126 and resource supplies (e.g., resource supply 142) of a plurality of ATMs accessible over network 105. Plan deviation program 300 can then determine one or more recommended alternate ATMs that can fulfill the transaction plan (e.g., ATM 140 and other accessible ATMs (not shown)), including de determined deviation (from step 302). In various embodiments, plan deviation program 300 can determine and identify alternate ATMs similarly to step 308 of notification program 200 (discussed previously with regard to FIG. 2).

In step 310, plan deviation program 300 notifies the user. In one embodiment, in response to determining that the user-preferred ATM can fulfill the deviated transaction plan (decision step 306, YES branch), plan deviation program 300 notifies the user that the user-preferred ATM can fulfill the transaction plan (step 310). In example embodiments, the notification can include an indication of the deviation in the transaction plan, along with the alternate ATM recommendations. Optionally, in response to determining that the user-preferred ATM can fulfill the transaction plan (decision step 306, YES branch), plan deviation program 300 can terminate without sending notification to the user. In another embodiment, subsequent to determining alternate ATM recommendations (in step 308), plan deviation program 300 send the user a notification that indicates that the user-preferred ATM cannot fulfill the transaction plan and includes the determines alternate ATM recommendations (from step 308). In various embodiments, plan deviation program 300 identifies user preferences for notifications (e.g., in user data 124) and tailors the notification accordingly.

In example embodiments, plan deviation program 300 notifies an individual utilizing computing device 110 by communicating the notification to application 114. Accordingly, plan deviation program 300 can send the user a notification that includes one of more of: an indication of a recommended alternate ATM (e.g., ATM 140), information to accompany the recommendation (e.g., reasoning behind the recommendation to utilize the alternate ATM, highlighting an increase in time or distance relative to the user-preferred ATM, etc.), a plurality of recommended alternate ATMs that the user can select from, a recommendation to wait until a specified time to make a withdrawal from the user-preferred ATM or an alternate ATM, a recommendation to visit an ATM because the user is travelling on a route that is not near an active ATM, information indicating a health status associated with a ATM access card of the user, and other information that can be specified by user preferences (e.g., in sure data 124).

Figure 4:
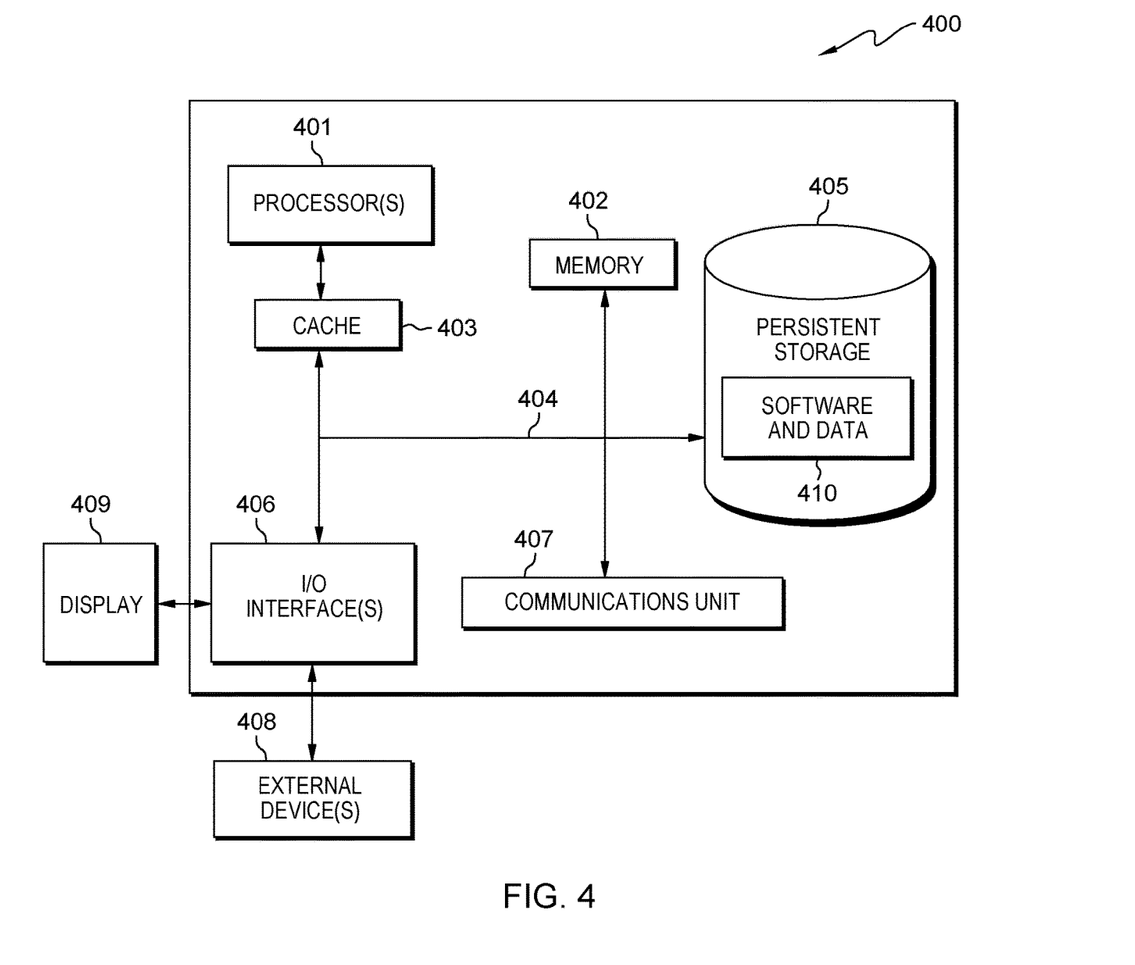
FIG. 4 depicts a block diagram of components of a computing system representative of the computing device, and server of FIG. 1, in accordance with an embodiment of the present invention.

FIG. 4 depicts computer system 400, which is representative of computing device 110 and server 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data 410) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processor(s) 401 via cache 403. With respect to computing device 110, software and data 410 is representative of user interface 112 and application 114. With respect to server 120, software and data 410 is representative of notification program 200, plan deviation program 300, user data 124, and historical ATM data 126.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   determining, by one or more processors, a transaction plan for a user, the transaction plan including a schedule of future transactions of the user based on historical user data and user-provided information, wherein the determined transaction plan includes a forecast future withdrawal amount and corresponding time and wherein determining a transaction plan for a user further comprises:
      determining, by one or more processors, whether the user has deviated from the determined transaction plan based on completed transactions of the user;
   identifying, by one or more processors, an automated teller machine (ATM) preferred by the user;
   determining, by one or more processors, whether the ATM preferred by the user can fulfill the determined transaction plan, based on analyzing a current resource supply of the ATM preferred by the user in relation to aggregated transaction plans from one or more other users, the aggregated transaction plans indicating use of the ATM preferred by the user; and
   in response to determining that the ATM preferred by the user cannot fulfill the determined transaction plan, determining, by one or more processors, one or more alternate ATMs that can fulfill the determined transaction plan.

2. The method of claim 1, further comprising:
   providing, by one or more processors, a notification to the user, the notification including at least a recommendation to utilize the determined one or more alternate ATMs.

3. The method of claim 1, further comprising:
   in response to determining that the user has deviated from the determined transaction plan, determining, by one or more processors, an updated transaction plan for the user based on the completed transactions, the updated transaction plan including an updated forecast future withdrawal amount and corresponding time.

4. The method of claim 1, wherein determining whether the ATM preferred by the user can fulfill the determined transaction plan further comprises:
   analyzing, by one or more processors, a current resource supply of the ATM preferred by the user and historical usage data for the ATM preferred by the user.

5. The method of claim 1, wherein determining one or more alternate ATMs that can fulfill the determined transaction plan further comprises:
   analyzing, by one or more processors, a respective current resource supply of a plurality of candidate alternate ATMs and historical usage data for the plurality of candidate alternate ATMs.

6. The method of claim 1, wherein determining one or more alternate ATMs that can fulfill the determined transaction plan further comprises:
   identifying, by one or more processors, at least one candidate alternate ATM that is on a travel path associated with the user.

7. The method of claim 1, wherein determining one or more alternate ATMs that can fulfill the determined transaction plan further comprises:
   retrieving, by one or more processors, sensor data from a plurality of candidate alternate ATMs, the sensor data including current resource supply data for respective ATMs of the plurality of candidate alternate ATMs.

8. A computer program product comprising:
   one or more computer readable storage media and program instructions stored on the one or more computer readable storage media, the program instructions comprising:
   program instructions to determine a transaction plan for a user, the transaction plan including a schedule of future transactions of the user based on historical user data and user-provided information, wherein the determined transaction plan includes a forecast future withdrawal amount and corresponding time and wherein program instructions to determine a transaction plan for a user further comprise program instructions to:
      determine whether the user has deviated from the determined transaction plan based on completed transactions of the user;
   program instructions to identify an automated teller machine (ATM) preferred by the user;

program instructions to determine whether the ATM preferred by the user can fulfill the determined transaction plan, based on analyzing a current resource supply of the ATM preferred by the user in relation to aggregated transaction plans from one or more other users, the aggregated transaction plans indicating use of the ATM preferred by the user; and in response to determining that the ATM preferred by the user cannot fulfill the determined transaction plan, program instructions to determine one or more alternate ATMs that can fulfill the determined transaction plan.

9. The computer program product of claim 8, further comprising program instructions, stored on the one or more computer readable storage media, to:

provide a notification to the user, the notification including at least a recommendation to utilize the determined one or more alternate ATMs.

10. The computer program product of claim 8, further comprising program instructions, stored on the one or more computer readable storage media, to:

in response to determining that the user has deviated from the determined transaction plan, determine an updated transaction plan for the user based on the completed transactions, the updated transaction plan including an updated forecast future withdrawal amount and corresponding time.

11. The computer program product of claim 8, wherein the program instructions to determine whether the ATM preferred by the user can fulfill the determined transaction plan further comprise program instructions to:

analyze a current resource supply of the ATM preferred by the user and historical usage data for the ATM preferred by the user.

12. The computer program product of claim 8, wherein the program instructions to determine one or more alternate ATMs that can fulfill the determined transaction plan further comprise program instructions to:

analyze a respective current resource supply of a plurality of candidate alternate ATMs and historical usage data for the plurality of candidate alternate ATMs.

13. A computer system comprising:

one or more computer processors;

one or more computer readable storage media; and program instructions stored on the computer readable storage media for execution by at least one of the one or more processors, the program instructions comprising:

program instructions to determine a transaction plan for a user, the transaction plan including a schedule of future transactions of the user based on historical user data and user-provided information, wherein the determined transaction plan includes a forecast future withdrawal amount and corresponding time and wherein program instructions to determine a transaction plan for a user further comprise program instructions to:

determine whether the user has deviated from the determined transaction plan based on completed transactions of the user;

program instructions to identify an automated teller machine (ATM) preferred by the user;

program instructions to determine whether the ATM preferred by the user can fulfill the determined transaction plan, based on analyzing a current resource supply of the ATM preferred by the user in relation to aggregated transaction plans from one or more other users, the aggregated transaction plans indicating use of the ATM preferred by the user; and in response to determining that the ATM preferred by the user cannot fulfill the determined transaction plan, program instructions to determine one or more alternate ATMs that can fulfill the determined transaction plan.

14. The computer system of claim 13, further comprising program instructions, stored on the computer readable storage media for execution by at least one of the one or more processors, to:

provide a notification to the user, the notification including at least a recommendation to utilize the determined one or more alternate ATMs.

15. The computer system of claim 13, further comprising program instructions, stored on the computer readable storage media for execution by at least one of the one or more processors, to:

in response to determining that the user has deviated from the determined transaction plan, determine an updated transaction plan for the user based on the completed transactions, the updated transaction plan including an updated forecast future withdrawal amount and corresponding time.

16. The computer system of claim 13, wherein the program instructions to determine whether the ATM preferred by the user can fulfill the determined transaction plan further comprise program instructions to:

analyze a current resource supply of the ATM preferred by the user and historical usage data for the ATM preferred by the user.

17. The computer system of claim 13, wherein the program instructions to determine one or more alternate ATMs that can fulfill the determined transaction plan further comprise program instructions to:

analyze a respective current resource supply of a plurality of candidate alternate ATMs and historical usage data for the plurality of candidate alternate ATMs.

18. The computer system of claim 13, wherein the program instructions to determine one or more alternate ATMs that can fulfill the determined transaction plan further comprise program instructions to:

identify at least one candidate alternate ATM that is on a travel path associated with the user.

\* \* \* \* \*